US012807795B2

(12) United States Patent
Wang et al.

(10) Patent No.: US 12,807,795 B2
(45) **Date of Patent: *Nov. 24, 2026**

(54) BIAXIALLY ORIENTED FILM

(71) Applicant: BOREALIS AG, Vienna (AT)

(72) Inventors: Jingbo Wang, Linz (AT); Friedrich Berger, Linz (AT); Arnaud Alabrune, Courbevoie (FR); Elisabeth Potter, Linz (AT)

(73) Assignee: BOREALIS AG, Vienna (AT)

( * ) Notice: Subject to any disclaimer, the term of this patent is extended or adjusted under 35 U.S.C. 154(b) by 150 days.

This patent is subject to a terminal disclaimer.

(21) Appl. No.: 18/699,065

(22) PCT Filed: Oct. 7, 2022

(86) PCT No.: PCT/EP2022/077927

§ 371 (c)(1),
(2) Date: Apr. 5, 2024

(87) PCT Pub. No.: WO2023/057620

PCT Pub. Date: Apr. 13, 2023

(65) Prior Publication Data

US 2024/0400806 A1 Dec. 5, 2024

(30) Foreign Application Priority Data

Oct. 7, 2021 (EP) .................................... 21201520

(51) Int. Cl.

| | |
|---|---|
| ***C08J 5/18*** | (2006.01) |
| ***B32B 27/08*** | (2006.01) |
| ***B32B 27/32*** | (2006.01) |
| ***C08L 23/0807*** | (2025.01) |

(52) U.S. Cl.

CPC .......... *C08L 23/0815* (2013.01); *B32B 27/08* (2013.01); *B32B 27/327* (2013.01); *C08J 5/18* (2013.01); *B32B 2250/242* (2013.01); *B32B 2270/00* (2013.01); *B32B 2307/30* (2013.01); *B32B 2307/414* (2013.01); *B32B 2307/518* (2013.01); *B32B 2307/54* (2013.01); *B32B 2307/72* (2013.01); *C08J 2323/08* (2013.01); *C08J 2345/00* (2013.01); *C08L 2203/16* (2013.01); *C08L 2207/062* (2013.01)

(58) Field of Classification Search

None

See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,582,816 A | 4/1986 | Miro | |
| 5,391,654 A | 2/1995 | Ahvenainen et al. | |
| 6,432,496 B1 | 8/2002 | Klosiewicz | |
| 6,689,857 B1 * | 2/2004 | Larter | C08J 5/18 428/307.3 |
| 6,969,740 B2 * | 11/2005 | Klosiewicz | C08L 23/04 525/240 |
| 7,176,259 B1 | 2/2007 | Klosiewicz | |
| 2009/0035546 A1 | 2/2009 | Mcleod | |
| 2016/0083488 A1 * | 3/2016 | Buryak | C08L 23/0815 526/348 |
| 2021/0213719 A1 * | 7/2021 | Ambroise | B32B 27/16 |

FOREIGN PATENT DOCUMENTS

| | | |
|---|---|---|
| EP | 0479186 A2 | 4/1992 |
| EP | 0688794 A1 | 12/1995 |
| EP | 0810235 A2 | 12/1997 |
| EP | 0891990 A2 | 1/1999 |
| EP | 1310295 A1 | 5/2003 |
| EP | 1378528 A1 | 1/2004 |
| EP | 1415999 A1 | 5/2004 |
| EP | 1591460 A1 | 11/2005 |
| EP | 3335874 A1 | 6/2018 |
| EP | 3554828 B1 | 9/2020 |
| WO | 96/18662 A1 | 6/1996 |
| WO | 96/19503 A1 | 6/1996 |
| WO | 96/32420 A1 | 10/1996 |
| WO | 97/44371 A1 | 11/1997 |
| WO | 99/51646 A1 | 10/1999 |
| WO | 01/55230 A | 8/2001 |
| WO | 2005/118655 A1 | 12/2005 |

(Continued)

OTHER PUBLICATIONS

Plastolyn R1140 Hydrocarbon Resin, Technical Data Sheet, Synthomer (Year: 2022).*

International Search Report and Written Opinion in Application No. PCT/EP2022/077927, mailed Jan. 20, 2023,.

"A novel high density polyethylene for film applications ED—Darl Kuhn", ip.com, ip.com Inc., West Henrietta, NY, US, May 13, 2021 (May 13, 2021), XP013189642, ISSN: 1533-0001.

*Primary Examiner* — Ramsey Zacharia

(74) *Attorney, Agent, or Firm* — Meunier Carlin & Curfman LLC

(57) ABSTRACT

The invention provides a biaxially oriented film comprising a polymer composition having a density 954 to 970 kg/m$^3$ and an $MFR_2$ of 0.5 to 2.0 g/10 min, wherein said composition comprises:

(i) 90 to 99 wt % of a multimodal high density polyethylene (HDPE) having a density of 945-970 kg/m$^3$, an $MFR_2$ of 0.1-3.0 g/10 min and a molecular weight distribution (MWD) of 5-25, the multimodal HDPE comprising at least two fractions:
  (A) 30 to 70 wt % of a lower molecular weight fraction being a polyethylene with a density of 955-980 kg/m$^3$ and an $MFR_2$ of 100-1000 g/10 min; and
  (B) 30 to 70 wt % of a higher molecular weight fraction being a polyethylene with a density of 940-960 kg/m$^3$ and an $MFR_2$ of 0.0001-1.0 g/10 min measured according to ISO 1133; and
(ii) 1 to 10 wt % of a hydrocarbon resin.

19 Claims, No Drawings

(56) References Cited

FOREIGN PATENT DOCUMENTS

| | | | |
|---|---|---|---|
| WO | 2007/025640 | A1 | 3/2007 |
| WO | 2011000497 | A1 | 1/2011 |
| WO | 2014/096296 | A1 | 6/2014 |
| WO | 2014/180989 | A1 | 11/2014 |
| WO | 2016/097193 | A1 | 6/2016 |
| WO | 2020/257411 | A1 | 12/2020 |
| WO | 2021079255 | A1 | 4/2021 |
| WO | 2023/046754 | A1 | 3/2023 |

* cited by examiner

BIAXIALLY ORIENTED FILM

This invention relates to a biaxially oriented film with beneficial mechanical and processing properties. In particular, the invention relates to a biaxially oriented film, comprising a bimodal high density polyethylene and a hydrocarbon resin, with improved properties. The invention further relates to laminates comprising the film and to the use of a composition comprising the bimodal high density polyethylene and hydrocarbon resin in the production of biaxially oriented films.

BACKGROUND OF INVENTION

Polymer films are widely used in packaging. These films must obviously protect the contents of the package from damage and the environment.

Polyethylene films are widely used in packaging and are often laminated with a relatively high heat resistant substrate like PET film to prepare a flexible package. However, such laminates cannot be readily recycled due to presence of two chemically different materials.

To resolve that problem a machine direction oriented polyethylene (MDO PE) or biaxially oriented polyethylene (BOPE) film can be used to replace the PET film. HDPE offers a good alternative to PET in terms of stiffness and thermal resistance. The resulting laminate comprises polyethylene only and is hence fully mechanically recycled.

Biaxial orientation of polyolefin films is a well-known and well established technology. The polymer requires stiffness at elevated temperature otherwise the film will break. A downside of the ability to withstand the elevated temperature stretching procedure is however, that biaxially oriented films made from HDPE result in very stiff and at the same time brittle, opaque, hazy and/or matt films. HDPE films also have the disadvantage of narrow processing windows.

There is thus a need to produce films which show good impact and optical properties coupled with an attractive processing window. The need to provide such biaxially oriented films with well-balanced mechanical and optical properties as well as good processing properties is also triggered by the desire to provide monomaterial packaging solutions which meet the increasing demand on easy recyclability.

WO 2020/257411 discloses a multilayer film comprising a core layer which contains at least 50 wt % of an HDPE and outer layers comprising ethylene-propylene polymers.

U.S. Pat. Nos. 6,969,740, 7,176,259 and 6,432,496 disclose oriented films comprising polyethylene and hydrocarbon resins and are focused on barrier properties.

The present inventors have unexpectedly found that a biaxially oriented film comprising a polymer composition containing a particular class of bimodal high density polyethylene (HDPE) and a hydrocarbon resin possesses an attractive balance of stiffness and haze, together with a good processing window.

SUMMARY OF INVENTION

Viewed from one aspect the invention provides a biaxially oriented film comprising a polymer composition having a density 954 to 970 kg/m$^3$ and an MFR$_2$ of 0.5 to 2.0 g/10 min, wherein said composition comprises:

(i) 90 to 99 wt %, relative to the total weight of the polymer composition, of a multimodal high density polyethylene (HDPE), wherein the multimodal HDPE has a density in the range of 945 to 970 kg/m$^3$, an MFR$_2$ of 0.1 to 3.0 g/10 min and a molecular weight distribution (MWD) of 5 to 25, and wherein the multimodal HDPE comprises at least two fractions:
   (A) 30 to 70 wt %, relative to the total weight of the multimodal HDPE, of a lower molecular weight fraction being a polyethylene with a density in the range of 955 to 980 kg/m$^3$ and an MFR$_2$ of 100 to 1000 g/10 min; and
   (B) 30 to 70 wt %, relative to the total weight of the multimodal HDPE, of a higher molecular weight fraction being a polyethylene with a density in the range of 940 to 960 kg/m$^3$ and an MFR$_2$ of 0.0001 to 1.0 g/10 min; and (ii) 1 to 10 wt %, relative to the total weight of the polymer composition, of a hydrocarbon resin.

Viewed from a second aspect, the invention provides a laminated film structure comprising a biaxially oriented film as hereinbefore defined laminated to a substrate.

Viewed from a further aspect, the invention provides the use of a polymer composition as hereinbefore defined in the production of a biaxially oriented film as hereinbefore defined.

DETAILED DESCRIPTION

The invention relates to a biaxially oriented film comprising a polymer composition with a particular combination of properties, wherein the composition comprises a multimodal HDPE and a hydrocarbon resin.

Multimodal High Density Polyethylene

The multimodal high density polyethylene (HDPE) may be a homopolymer or a copolymer, but is preferably an ethylene copolymer. By ethylene copolymer is meant a polymer the majority by weight of which derives from ethylene monomer units (i.e. at least 50 wt % ethylene relative to the total weight of the copolymer). The comonomer contribution preferably is up to 10% by mol, more preferably up to 5% by mol. Ideally however there are very low levels of comonomer present in the polymers of the present invention such as 0.1 to 2.0 mol %, e.g. 0.1 to 1.0 mol %.

The other copolymerisable monomer or monomers are preferably C3-12, especially C3-10, alpha olefin comonomers, particularly singly or multiply ethylenically unsaturated comonomers, in particular C3-10-alpha olefins such as propene, but-1-ene, hex-1-ene, oct-1-ene, and 4-methyl-pent-1-ene. The use of 1-hexene, 1-octene and 1-butene, or mixtures thereof, is particularly preferred, especially 1-hexene and 1-butene. Ideally there is only one comonomer present.

The polymer of the invention is multimodal and therefore comprises at least two components. The polymer is preferably bimodal. The polymer of the invention most preferably comprises (A) a lower molecular weight ethylene homopolymer component, and (B) a higher molecular weight ethylene copolymer component.

The HDPE of the invention is multimodal. Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. The polyethylene may also be multimodal with respect to comonomer content.

The form of the molecular weight distribution curve, i.e. the appearance of the graph of the polymer weight fraction as a function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The HDPE of the invention has an $MFR_2$ of 0.1 to 3.0 g/10 min. Preferable ranges for $MFR_2$ are 0.2 to 2.0 g/10 min, such as 0.5 to 1.8 g/10 min.

The HDPE of the invention preferably has an $MFR_{21}$ of 15 to 180 g/10 min, such as 20 to 150 g/10 min, most preferably 30 to 100 g/10 min.

The HDPE of the invention preferably has a Flow Rate Ratio (FRR) of the $MFR_{21}/MFR_2$ of at least 25.0, like at least 35.0, more preferably at least 45.0 Furthermore, the HDPE of the invention preferably has a Flow Rate Ratio (FRR) of the $MFR_{21}/MFR_2$ of up to 80.0, like up to 75.0, more preferably up to 70.0.

The density of the HDPE is in the range 945 to 970 kg/$m^3$. Preferably, the HDPE has a density of 953 to 965 kg/$m^3$, more preferably 954 to 963 kg/$m^3$, such as 955 to 960 kg/$m^3$.

The HDPE of the invention has a molecular weight distribution (MWD) in the range 5 to 25, preferably 7 to 30, such as 10 to 20.

The HDPE of the invention comprises at least a lower molecular weight component (A) and a higher molecular weight component (B). In one particularly preferable embodiment, the HDPE consists of components (A) and (B). The weight ratio of fraction (A) to fraction (B) in the composition is in the range 30:70 to 70:30, more preferably 35:65 to 65:35, most preferably 40:60 to 60:40. In some embodiments the ratio may be 35 to 50 wt % of fraction (A) and 50 to 65 wt % fraction (B), such as 40 to 50 wt % of fraction (A) and 50 to 60 wt % fraction (B), most preferably 48 to 50 wt % of fraction (A) and 50 to 52 wt % fraction (B), wherein the wt % are relative to the total weight of the multimodal HDPE.

Each of Fraction (A) and Fraction (B) may be an ethylene homopolymer or an ethylene copolymer. By ethylene homopolymer is meant a polymer comprising at least 97 mol % (such as at least 98 mol %, especially at least 99.5 mol %) ethylene monomer units. The term "ethylene copolymer" is defined above. Most preferably, fraction (A) is an ethylene homopolymer and fraction (B) is an ethylene copolymer.

The HDPE of the invention is produced in a multistage process wherein fractions (A) and (B) are produced in subsequent stages. In such a case, the properties of the fractions produced in the second step (or further steps) of the multistage process can either be inferred from polymers which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present.

Thus, although not directly measurable on the multistage process products, the properties of the fractions produced in higher stages of such a multistage process can be determined by applying either or both of the above methods. The skilled person will be able to select the appropriate method.

Polymer HDPEs produced in a multistage process are also designated as "in-situ" blends. The resulting end product consists of an intimate mixture of the polymers from the two or more reactors, the different molecular-weight-distribution curves of these polymers together forming a molecular-weight-distribution curve having a broad maximum or two or more maxima, i.e. the end product is a multimodal polymer mixture The lower molecular weight fraction (A) has an $MFR_2$ of 100 to 1000 g/10 min, preferably of 125 to 900 g/10 min, more preferably 150 to 800 g/10 min, such as 200 to 750 g/10 min.

Fraction (A) has a density of 955 to 980 kg/$m^3$, preferably 960 to 978 kg/$m^3$, such as 965 to 975 kg/$m^3$.

Fraction (A) can be an ethylene homopolymer or copolymer. Preferably, Fraction (A) is an ethylene homopolymer.

The higher molecular weight fraction (B) has an $MFR_2$ of 0.0001 to 1.0 g/10 min, preferably of 0.0005 to 0.5 g/10 min, more preferably 0.0008 to 0.1 g/10 min, such as 0.001 to 0.05 g/10 min.

Fraction (B) has a density of 940 to 960 kg/$m^3$, preferably 941 to 950 kg/$m^3$.

Fraction (B) can be an ethylene homopolymer or copolymer. Fraction (B) is preferably a copolymer. Preferred ethylene copolymers employ alpha-olefins (e.g. C3-12 alpha-olefins) as comonomers. Examples of suitable alpha-olefins include but-1-ene, hex-1-ene and oct-1-ene. But-1-ene is an especially preferred comonomer.

Preparation of Multimodal HDPE

The multimodal HDPE may be produced by polymerisation using conditions which create a multimodal (e.g. bimodal) polymer product ideally using a Ziegler Natta catalyst system. Typically, a two or more stage, i.e. multistage, polymerisation process is used with different process conditions in the different stages or zones (e.g. different temperatures, pressures, polymerisation media, hydrogen partial pressures, etc). Preferably, the multimodal (e.g. bimodal) composition is produced by a multistage polymerisation, e.g. using a series of reactors, with optional comonomer addition preferably in only the reactor(s) used for production of the higher/highest molecular weight component(s). A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Preferably, the multimodal HDPE is a bimodal HDPE prepared in a two-stage polymerisation process.

The first polymerisation stage produces an ethylene homopolymer or an ethylene copolymer, typically an ethylene homopolymer, which is subsequently fed to the second polymerisation stage. The second polymerisation stage can produce a further ethylene homopolymer, or an ethylene copolymer, preferably an ethylene copolymer.

The first polymerisation stage is preferably a slurry polymerization step.

The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to 50% by mole, preferably from 2 to 20% by mole and in particular from 2 to 10% by mole. The benefit of having a high ethylene concentration is that the productivity of the catalyst is increased but the drawback is that more ethylene then needs to be recycled than if the concentration was lower.

The temperature in the first polymerisation stage is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerisation may be conducted in any known reactor used for slurry polymerization. Such reactors include a continuous stirred tank reactor and a loop reactor. It is especially preferred to conduct the slurry polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the first polymerization stage as a slurry polymerisation in a loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerisation stage continuously.

Hydrogen is typically introduced into the first polymerisation stage for controlling the $MFR_2$ of the resultant polymer. The amount of hydrogen needed to reach the desired MFR depends on the catalyst used and the polymerisation conditions. The desired polymer properties may be obtained in slurry polymerisation in a loop reactor with the molar ratio of hydrogen to ethylene of from 100 to 1000 mol/kmol (or mol/1000 mol) and preferably of from 200 to 800 mol/kmol.

The average residence time in the first polymerisation stage is typically from 20 to 120 minutes, preferably from 30 to 80 minutes. As it is well known in the art the average residence time $\tau$ can be calculated from Equation 1 below:

$$\tau = \frac{V_R}{Q_o}$$ Equation 1: Residence Time

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate is suitably controlled with the catalyst feed rate. It is also possible to influence the production rate by suitable selection of the monomer concentration. The desired monomer concentration can then be achieved by suitably adjusting the ethylene feed rate.

In the second polymerisation stage, ethylene is polymerised, optionally together with at least one alpha-olefin comonomer, in the presence of the catalyst and the ethylene polymer produced in the first polymerisation stage. It will thus be appreciated that the second polymerisation stage generates an ethylene polymer, which combines with the ethylene polymer from the first polymerisation stage, to form the multimodal HDPE of the invention. Preferable comonomers are discussed hereinbefore, however it is noted that it is particularly preferable if the at least one alpha-olefin is butene.

The second polymerisation stage is preferably a gas phase polymerisation step, i.e. carried out in a gas-phase reactor. Any suitable gas phase reactor known in the art may be used, such as a fluidised bed gas phase reactor.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

A chain transfer agent (e.g. hydrogen) is typically added to the third polymerisation stage, preferably in amounts of 50 to 500 mol of $H_2$/kmol ethylene.

The split between the first polymerisation stage and the second polymerisation stage (i.e. between the slurry polymerisation and the gas phase polymerisation) is typically 30:70 to 70:30, more preferably 35:65 to 65:35, most preferably 40:60 to 60:40.

Prepolymerization

The polymerization steps discussed above may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is understood within the scope of the invention, that the amount of polymer produced in the prepolymerization typically lies within 1-5 wt % in respect to the final multimodal HDPE.

Catalyst

The polymerization is typically conducted in the presence of a Ziegler-Natta polymerization catalyst. Suitable Ziegler-Natta (ZN) catalysts generally comprise at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), optionally a compound of group 13 of the Periodic Table (IUPAC), and optionally an internal organic compound, like an internal electron donor. A ZN catalyst may also comprise further catalyst component(s), such as a cocatalyst and optionally external additives.

Suitable ZN catalysts preferably contain a magnesium compound, an aluminium compound and a titanium compound supported on a particulate support.

The particulate support can be an inorganic oxide support, such as silica, alumina, titania, silica-alumina, silica-titania or a MgCl2 based support. Preferably, the support is silica or a MgCl2 based support.

Particularly preferred Ziegler-Natta catalysts are such as described in EP 1378528 A1.

If used, the magnesium compound preferably is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is a chlorine containing aluminium alkyl. Especially preferred compounds are aluminium alkyl dichlorides and aluminium alkyl sesquichlorides.

The transition metal compound of Group 4 to 6 is preferably a titanium or vanadium compound, more preferably a halogen containing titanium compound, most preferably chlorine containing titanium compound. Especially preferred titanium compound is titanium tetrachloride.

The catalyst can be prepared by sequentially contacting the carrier with the above mentioned compounds, as described in EP 688794 or WO 99/51646. Alternatively, it can be prepared by first preparing a solution from the components and then contacting the solution with a carrier, as described in WO 01/55230.

Another group of suitable ZN catalysts contain a titanium compound together with a magnesium halide compound acting as a support. Thus, the catalyst contains a titanium compound and optionally a Group 13 compound for example an aluminium compound on a magnesium dihalide, like magnesium dichloride. Such catalysts are disclosed, for instance, in WO 2005/118655, EP 810235, WO 2014/096296 and WO 2016/097193.

Suitable activators are group 13 metal compounds, typically group 13 alkyl compounds and especially aluminium alkyl compounds, where the alkyl group contains 1 to 16 C-atoms. These compounds include trialkyl aluminium compounds, such as trimethylaluminium, triethylaluminium, tri-isobutylaluminium, trihexylaluminium and tri-n-octylaluminium, alkyl aluminium halides, such as ethylaluminium dichloride, diethylaluminium chloride, ethylaluminium sesquichloride, dimethylaluminium chloride and the like. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

An optional internal organic compound may be chosen from the following classes: ethers, esters, amines, ketones, alcohols, anhydrides or nitriles or mixtures thereof. Preferably, the optional internal organic compound is selected from ethers and esters, most preferably from ethers. Preferred ethers are of 2 to 20 carbon-atoms and especially mono, di or multi cyclic saturated or unsaturated ethers comprising 3 to 6 ring atoms. Typical cyclic ethers suitable in the present invention, if used, are tetrahydrofuran (THF), substituted THF, like 2-methyl THF, di-cyclic ethers, like 2,2-di(2-tetrahydrofuryl) propane, 2,2-di-(2-furan)-propane, or isomers or mixtures thereof. Internal organic compounds are also often called as internal electron donors.

In the production of the multimodal HDPE of the present invention, preferably a compounding step is applied, wherein the composition of the base resin, i.e. the blend, which is typically obtained as a base resin powder from the reactor, is extruded in an extruder and then pelletised to polymer pellets in a manner known in the art.

The multimodal HDPE may also contain minor quantities of additives such as pigments, nucleating agents, antistatic agents, fillers, antioxidants, etc., generally in amounts of up to 10% by weight, preferably up to 5% by weight.

Optionally, additives or other polymer components can be added to the multimodal HDPE during the compounding step in the amount as described above. Preferably, the multimodal HDPE of the invention obtained from the reactor is compounded in the extruder together with additives in a manner known in the art.

Hydrocarbon Resin

The Hydrocarbon Resin employed in the present invention can be any low molecular weight polymer derived by polymerizing an olefin feedstock, where the weight average molecular weight (MW) of the material is less than about 20,000 Dalton. Suitable resins have a Mw of less than about 10,000, with hydrocarbon resins of Mw less than 5,000 being preferred, for example resins of at least about 500 to about 2,000 Mw. Mw of the resins are determined using size exclusion chromatography (SEC) using polystyrene as a standard.

The resins can be derived from crude olefin feeds produced in the petroleum cracking process. Examples of these crude olefin feeds include a light olefin fraction having an average carbon number of 5 carbon atom per olefin molecule (C5 feeds) or cyclic olefins having an average of 9 carbon atom per olefin molecule (C9 feeds). Resins produced from olefin streams rich in DCPD derived from ethylene cracking can also be used effectively in this invention. Useful resins can also be produced from terpene olefins, such as limonene derived from citrus products. Lastly the resins derived from polymerization of pure monomer streams consisting of styrene, [alpha]-methylstyrene, 4-methylstyrene and vinyltoluene can be utilized in this invention.

In order to be compatible with the multimodal HDPE, the hydrocarbon resin is ideally aliphatic in character, and for this reason hydrogenated resins with little residual aromatic character are preferable. Fully hydrogenated resin products are preferred because of their light colour and thermal stability.

Thus, in one preferred embodiment of the invention, the hydrocarbon resin is an aliphatic resin.

The hydrocarbon resin may be linear or cyclic, preferably cyclic.

A particularly preferred class of hydrocarbon resins are cyclic aliphatic hydrocarbon resins.

One example of a resin useful in this invention is the resin derived from the polymerization of a crude C9 feed stream, followed by catalytic hydrogenation. C9 feedstock is defined as the olefin stream produced during petroleum cracking comprised of hydrocarbon olefin components having about 9 carbon atoms per molecule. Examples of olefins found in a C9 feed include but are not limited to styrene, [alpha]-methylstyrene, indene, various methyl substituted indenes, 4-methylstyrene, [beta]-methylstyrene, ethylstyrene, among other olefins. The resultant resin product is aromatic in character, but can be converted to an aliphatic type resin by catalytic hydrogenation.

By "hydrogenation" is meant that residual olefin groups in the resin and the aromatic units in the resin, are converted to saturated species by reduction with hydrogen. Hydrogenation reactions be carried under various conditions, examples being at temperatures in the range of about 150° C. to about 320° C., using hydrogen pressures between about 50 to about 2000 psi. More typically, the hydrogenation would be carried out at temperatures between about 200° C. to about 300° C. to produce the desired product. A typical catalyst for hydrogenating these resins would be Ni metal supported on a carrier such as carbon black. In this class, the preferred type of product would be a resin having more than about 90% of the aromatic units hydrogenated, preferably greater than about 95% of the aromatic units hydrogenated.

Examples of this type of resin are Regalite® R-125 resin available from Hercules Incorporated, Middelburg, The Netherlands or Arkon® P-125 resin available from Arakawa Chemical Co.

Another example of a resin effective in this application are resins derived from polymerization of pure monomers such as styrene, [alpha]-methylstyrene, 4-methylstyrene, vinyltoluene, or any combination of these or similar pure monomer feedstocks. The product produced by this polymerization is aromatic in character, but can be converted to an aliphatic type resin by catalytic hydrogenation. The process used to hydrogenate these resins is similar to the process, described above, suitable for hydrogenating resins derived from C9 olefin feedstocks. These resins, derived from hydrogenating oligomers of pure monomers, can be hydrogenated to various degrees, where between about 20% to about 100% of the aromatic groups in the resin are reduced to saturated units. Preferably greater than about 90% of the hydrogenated units should be hydrogenated, and more preferred is a degree of hydrogenation greater than about 95%.

Examples of these resins are Regalrez® 1139 resin or Regalrez® 1126 resin available from Hercules Incorporated.

Resins useful in this invention can also be derived from the polymerization of terpene olefins, examples being the cationic polymerization of monomers such as [alpha]-pinene, [beta]-pinene, or d-limonene. These resins are aliphatic-type materials and hydrogenation is not required to achieve aliphatic character. However, hydrogenation to saturate residual olefin groups in the resin can be carried out to produce resins with greater thermal stability which can be likewise used as part of this invention. Examples of resins of this type include Piccolyte® A-135 and Piccolyte® C-125 resins available from Hercules Incorporated.

The most preferred resin for this invention are resins derived by thermally polymerizing olefin feeds rich in dicyclopentadiene (DCPD). Resins of this type can be produced by thermally reacting olefin streams containing between about 50% to about 100% DCPD at temperatures in the range of about 200° C. to about 325° C. to produce resin products which can be hydrogenated to form fully saturated materials with weight average molecular weight (Mw) values below about 5000 Daltons. Hydrogenation of these resins is not required, but is greatly preferred to achieve a low color DCPD resin product with good thermal stability. As an example, a DCPD feed containing nominally 85% DCPD, can be converted into a resin product by heating the DCPD to temperatures in the range about 260° C. to about 300° C., for a suitable time, typically in the range of about 10 to about 200 minutes, depending on temperature, to produce a resin which after hydrogenation and stripping to remove volatile components exhibits a Ring and Ball (R&B) softening point in the range of about 100° C. to about 170° C., as determined by ASTM D28-67, aliphatic character, and Mw less than about 5000.

An example of this type of resin is Plastolyn R1140 resin available from Eastman Chemical Company.

The hydrocarbon resins of the invention preferably have a Ring and Ball (R&B) softening point in the range of about 100° C. to about 170° C., more preferably 110 to 160° C., as determined by ASTM D28-67.

Composition

The polymer composition comprises 90 to 99 wt % of the multimodal HDPE and 1 to 10 wt % of the hydrocarbon resin, wherein the wt % values are relative to the total weight of the polymer composition.

In a preferred embodiment, the HDPE is present in an amount of 92 to 98.5 wt %, more preferably 93 to 98 wt %, such as 95 to 97.5 wt %, relative to the total weight of the polymer composition.

It is preferred if the hydrocarbon resin is present in an amount of 1.5 to 8 wt %, more preferably 2 to 7 wt %, such as 2.5 to 5 wt %, relative to the total weight of the polymer composition.

Whilst it is within the ambit of the invention for polymers other than the multimodal HDPE and the hydrocarbon resin to be present in the polymer composition, it is preferable if the multimodal HDPE and the hydrocarbon resin are the only polymer components present.

The polymer composition preferably consists of the multimodal HDPE and the hydrocarbon resin. For the avoidance of doubt, it is envisaged that usual polymer additives, e.g. pigments, nucleating agents, antistatic agents, fillers and antioxidants, may be present even when the polymer composition "consists" of the multimodal HDPE and the hydrocarbon resin. The term "consists of" is not intended therefore to exclude the presence of polymer additives. It does however exclude the presence of other polymer components for blending with the HDPE and the hydrocarbon resin. If a carrier polymer is used as part of a masterbatch, that is not excluded however. The composition may be free of any other mixing polymers but may still comprise minor amounts of carrier polymer used for masterbatches.

The polymer composition is typically prepared by blending and homogeneously mixing the components (e.g. the multimodal HDPE and hydrocarbon resin), for example by melt mixing in an extruder.

The polymer composition has an $MFR_2$ of 0.5 to 2.0 g/10 min. Preferable ranges for $MFR_2$ are 0.6 to 1.5 g/10 min, such as 0.75 to 1.0 g/10 min.

The polymer composition of the invention preferably has an $MFR_{21}$ of 15 to 80 g/10 min, such as 20 to 75 g/10 min, most preferably 30 to 65 g/10 min.

The polymer composition of the invention preferably has a Flow Rate Ratio (FRR) of the $MFR_{21}/MFR_2$ of at least 30.0, like at least 40.0, more preferably at least 50.0 Furthermore, the HDPE of the invention preferably has a Flow Rate Ratio (FRR) of the $MFR_{21}/MFR_2$ of up to 100.0, like up to 90.0, more preferably up to 80.0.

The density of the polymer composition is in the range 954 to 970 kg/m$^3$. Preferably, the polymer composition has a density of 955 to 965 kg/m$^3$, more preferably 955 to 96 kg/m$^3$.

Film

The film of the invention is a biaxially oriented film. The biaxially oriented films of the present invention can have a thickness in the range of 5.0-100 μm, such as 8.0-75.0 μm, like 10.0-50 μm or 13.0-30.0 μm.

The biaxially oriented films of the present invention show good optical properties in view of haze transparency when measured according to ASTM D1003. The haze is typically 9.0% or lower such as 8.0 or 5.0% or lower. The haze may be in the range of 0.5 to 9.0, preferably 1.0 to 8.0, more preferably 1.5 to 5.0. Preferably the measurements for haze are done 15 μm films.

Further, it is preferred that the film has a tensile modulus (TM) determined according to ISO 527-3 on 15 μm films in machine direction (MD) of 1000 to 4000 MPa, more preferably in the range of 1500 to 3000 MPa.

The films may have a TM/Haze ratio of >115, preferably >120, more preferably >200, such as >300. A typical upper limit for the TM/Haze ratio is 2000, such as 1500, e.g. 1000.

The films of the invention ideally have a stretch ratio in the machine direction (MD) and/or transverse direction (TD) of more than 5.0 times, preferably at least 6.0 times, such as at least 7.0 times.

Preferably, the films have a processing window of at least 5° C., such as at least 10° C. Typically, the films will have a processing window of up to 20° C., such as up to 15° C. By "processing window" we mean the temperature interval between the lowest temperature at which one can stretch, and the highest temperature for stretching, beyond which the film starts to be molten and has too low a viscosity to be stretched.

In one embodiment of the invention, the films consist essentially of the polymer composition. The term "consists essentially of" means that the polymer composition of the invention is the only "non additive" polymer component present in the film. It will be appreciated that some standard polymer additives might be supported on a polyolefin (a so called masterbatch as is well known in the art). The term consists essentially of does not exclude the presence of such a supported additive.

The biaxially oriented films of the present invention can be monolayer films or multilayer films. Multilayer films may comprise 2 or more layers, such as 3, 5, 7 or more layers. Preferably, the film is a monolayer film.

If the biaxially oriented film is a multilayer film, the polymer composition may be present in a core layer or in any outer layer. In a preferred embodiment, the biaxially oriented film of the present invention is a multilayer film having a core and one or more adjacent layers (e.g. two outer layers), wherein the core layer comprises the polymer composition and the outer layers comprise low melting polyethylene grades (e.g. LLDPE) which have low density, and are suitable for good sealing behaviour. Suitable outer layers can comprise LLDPE, LDPE or other polyethylene grades, such as elastomers or plastomers preferably having a density of at most 929 kg/m$^3$, such as 860 to 925 kg/m$^3$, such as 875-920 kg/m$^3$. The person skilled is well aware what materials can be used as sealing layers.

The polymer composition of the invention may form at least 1.0 wt % of the layer in film in which it is present. It is preferred that a layer within the biaxially oriented film comprises between 1.0 and 100 wt.-% of the polymer composition, such as at least 30.0 wt %, or at least 50.0 wt % or at least 70.0 wt.-% of the polymer composition. It is further preferred that a layer of a film comprises the polymer composition in ranges of 30.0-98.0 wt.-%, such as 50.0-95.0 or 70.0-85.0 wt %. The layer may consist of the polymer composition.

In case the biaxially oriented film of the present invention is a multilayer film, the layer distribution should be as such that the layer comprising the polymer composition forms a major part of the film structure and the sealing layers form a minor part. Possible layer distributions may be outer layer 1.0-25.0%, core layer 50.0-98.0%, outer layer 1.0-25.0%, wherein the percentages are seen in relation to the total thickness of the film. It is preferred, that each of the outer layers forms 3.0-20.0%, such as 4.0-15.0% or 5.0-10.0% of the total thickness of the film, and the core layer preferably has 60.0-94.0%, preferably 70-92%, such as 80-90% of the total film thickness.

The multilayer films of the present invention can be symmetric (with both outer layers having the same thickness, or asymmetric (with just one outer layer or with two or more outer layers differing in view of their thickness.

The biaxially oriented films of the present invention can be laminated to other substrates to form a laminated structure. Suitable substrates include but are not limited to, biaxially oriented polypropylene film, oriented PET film, oriented polyamide film, blown and cast PE film, aluminum foil and paper. In particular, the substrate to which the biaxial film of the invention is laminated is preferably a polyethylene film. In this way, the entire laminate is formed from polyethylene based polymers.

It is preferred if the laminate is formed from a mono or multilayer biaxial film as defined herein and a substrate layer, such as a polyethylene substrate layer. That substrate layer is most especially a polyethylene blown film such as one comprising HDPE, MDPE, LLDPE, LDPE and ethylene based plastomers and elastomers.

In any such laminate, there is preferably one film layer based on the biaxially oriented film of the invention. Such a biaxially oriented film layer within a laminated structure can have a thickness in the range of 5.0-100 μm, such as 10.0-75.0 μm, like 13.0-50 μm. The substrate layer may have a thickness of 5.0-100 μm, such as 10.0-75.0 μm, like 15.0-50 μm or 20.0-40.0 μm.

The biaxially oriented films or laminates of the present invention may be used for the production of packaging articles like bags, pouches, labels or lids, or other technical applications like banknotes. The biaxially oriented films or laminates of the present invention are preferably used for applications related to food packaging.

The manufacture of biaxially oriented films is well known (e.g. chapter 2 and 3 in Biaxial stretching of film: principles and applications, editored by Mark T. DeMeuse, Woodhead Publishing, 2011). The person skilled in the art can apply his knowledge of BOPP film production to the manufacture of the BOPE films of the invention. The films of the invention may be manufactured by any known technology, such as the double bubble, tenter frame or spontaneous process.

In a typical process, the components of the film are initially mixed and melted within an extruder. The temperature within the extruder is conventional and will be sufficient to ensure melting of the components. The extrudate is cast to form a cast film (or flat film) which is then cooled. The film should ideally be cooled to a temperature of less than 50° C. before any reheating process is begun. The film is then reheated and stretching is begun. The temperature during the stretching phase can vary and may decrease as the stretching process continues. The reheat temperature in step d) is defined as the temperature at the start of the stretching process. Once stretching in the machine direction is complete, the film is annealed. This maintains the MDO film structure for the TD stretch. Reheating for the second stretching phase is carried out and again, the temperature can vary during the stretching phase. The reheat temperature in step g) is defined therefore as the temperature at the start of the second stretch procedure. Finally, the film is allowed to cool.

The present invention will now be described in further detail by the examples provided below:

Determination Methods

The following definitions of terms and determination methods apply for the above general description of the invention as well as to the below examples unless otherwise defined.

Melt Flow Rate (MFR)

The melt flow rates are measured at 190° C. with a load of 2.16 kg ($MFR_2$) or 21.6 kg ($MFR_{21}$) according to ISO 1133

Calculation of $MFR_2$ of Fraction (A) and (B)

$$\log A = x \cdot \log B + (1 - x) \cdot \log C$$

$$C = 10\wedge^{\frac{(\log A - x, \log B)}{(1-x)}}$$

B=$MFR_2$ of Fraction (A)

C=$MFR_2$ of Fraction (B)

A=final $MFR_2$ (mixture) of multimodal HDPE

X=weight fraction of Fraction (A)

Flow Rate Ratio (FRR21/2))

FRR is determined as the ratio between the $MFR_{21}$ and the $MFR_2$.

GPC

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19\times10^{-3}\ \text{mL/g},\ \alpha_{PS} = 0.655$$

$$K_{PE} = 39\times10^{-3}\ \text{mL/g},\ \alpha_{PE} = 0.725$$

$$K_{PP} = 19\times10^{-3}\ \text{mL/g},\ \alpha_{PP} = 0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Density

The density was measured according to ISO 1183 and ISO1872-2 for sample preparation.

Tensile Tests

Tensile modulus, tensile strength and elongation at break were determined according to ISO527-3 on film samples prepared as described under the Film Sample preparation with film thickness of 15 μm. Tensile modulus was measured in machine and/or transverse direction according to ISO 527-3 at a cross head speed of 1 mm/min for the modulus.

Haze

Haze as a measure for the optical appearance of the films was determined according to ASTM D1003 on film samples with a thickness of 15 μm.

Examples

Materials:

HDPE1: A bimodal HDPE produced with a metallocene catalyst, it is pelletized with 200 ppm Irganox 1010 (supplied by BASF), 800 ppm Irgafos 168 (supplied by BASF), 1000 ppm Calciumstearat (CEASIT FI, supplied by Baerlocher) on a twin screw extruder. It has final $MFR_2$ of 1.8 g/10 min, $MFR_{21}$ of 48 g/10 min and density of 959.0 kg/m$^3$.

HDPE2: a bimodal HDPE produced with a ZN catalyst (as disclosed in EP 2994506), in a pilot plant, with a configuration of prepolymerisation-loop-gas phase reactor, having MFR 0.8 g/10 min, density 955.5 kg/m$^3$. It is pelletized with same recipe as HDPE1.

HC: Plastolyn R1140 hydrocarbon resin, supplied by Eastman Chemical Company, R&B softpoint 139° C.

Table 1 shows the typical polymerisation parameters for HDPE 2. Table 2 shows the final polymer properties for HDPE1 and HDPE2.

TABLE 1

| | HDPE2 |
|---|---|
| Prepoly | |
| Temp. (° C.) | 70 |
| Press. (kPa) | 5700 |
| H2 (g/h) | 5.0 |
| Loop reactor | |

TABLE 1-continued

| | HDPE2 |
|---|---|
| Fraction (A) | |
| Temp. (° C.) | 95 |
| Press. (kPa) | 5500 |
| C2 conc. (mol-%) | 3.5 |
| H2/C2 (mol/kmol) | 430.0 |
| Density | 970.0 |
| split % | 49.0 |
| MFR2 (g/10 min) | 350.00 |
| GPR | |
| Fraction (B) | |
| Temp. (° C.) | 85 |
| Press. (kPa) | 2000 |
| H2/C2 (mol/kmol) | 110 |
| C4/C2 (mol/kmol) | 25.0 |
| split % | 51.0 |
| Density (kg/m3) | 955.5 |
| MFR2 (g/10 min) | 0.80 |

TABLE 2

| | HDPE1 | HDPE2 |
|---|---|---|
| Pellet | | |
| Density (kg/m3) | 959.0 | 955.5 |
| MFR2 (g/10 min) | 1.7 | 0.8 |
| MFR21 (g/10 min) | 48 | 47.4 |
| MFR21/MFR2 | 28.2 | 59.2 |
| Mw | 92300 | 131000 |
| MWD | 3.94 | 16.6 |
| Tensile Modulus | 915 | 950 |
| MFR in GPR | 0.1 | 0.002 |
| Density in GPR | 955 | 941.6 |

Film Preparation

Blending of HDPE with HC resin was done on a lab scale twin screw extruder, ZSK 18, with melt temperature of 205° C. and output rate of 7 kg/h. The recipe is shown in Table 3. Biaxially oriented films from HDPE1, HDPE2 and HC were prepared on a Karo 4 lab scale stretch facility to produce compositions IE1, IE2 and CE1 as shown in Table 3. Sheet before stretching is made from as lab scale cast line, with a chill roll temperature of 70° C. The initial sheet thickness was controlled according to the maximum stretch ratio to reach the final film thickness of 15 μm. The stretch conditions, such as preheating time and stretch temperature are tuned by a person skilled in the art.

Properties of the films are shown in Table 3. CE1 has very narrow process window, it is only stretchable between 129-130° C., and the film breaks at very low stretch ratio. Moreover, the film itself is very brittle and it is easily broken when it is released from clip. Therefore no further results are available. As can be seen, the IEs have broader processing windows between 115 and 128° C. Furthermore, they possess excellent stiffness and low haze.

TABLE 3

| | IE1 | IE2 | CE1 |
|---|---|---|---|
| Composition | 97.5 wt % HDPE2<br>2.5 wt % HC | 95 wt % HDPE2<br>5 wt % HC | 95 wt % HDPE1<br>5% HC |
| $MFR_2$ (g/10 min) | 0.86 | 0.91 | 2.08 |
| $MFR_{21}$ (g/10 min) | 55.65 | 68.98 | 56.1 |
| MFR21/MFR2 | 64.7 | 75.8 | 27.0 |
| Density (kg/m$^3$) | 955.6 | 957.7 | 961.4 |

TABLE 3-continued

| | IE1 | IE2 | CE1 |
|---|---|---|---|
| BOPE FILM | | | |
| Stretch ratio | 7.5 × 7.5 | 7.5 × 7.5 | n.a. |
| Temperature range (° C.) | 115-128 | 115-128 | 129-130 |
| Process windows (° C.) | 13 | 13 | 1 |
| Thickness (μm) | 15.4 | 15.4 | n.m. |
| Tensile Modulus (MPa)/MD | 1848 | 1923 | n.m. |
| Tensile Strength (MPa)/MD | 184 | 171 | n.m. |
| Elongation at break (%)/MD | 101 | 120 | n.m. |
| Haze (%) | 4.2 | 4.3 | n.m. |
| TM/haze | 440 | 447 | n.a. |

The invention claimed is:

1. A biaxially oriented monolayer film comprising a polymer composition having a density 954 to 970 kg/m$^3$ measured according to ISO 1183, and an $MFR_2$ of 0.5 to 2.0 g/10 min, measured according to ISO 1133, wherein said composition comprises:

(i) 90 to 99 wt %, relative to the total weight of the polymer composition, of a multimodal high density polyethylene (HDPE), wherein the multimodal HDPE has a density in the range of 945 to 970 kg/m$^3$ measured according to ISO 1183, an $MFR_2$ of 0.1 to 3.0 g/10 min according to ISO 1133 and a molecular weight distribution (MWD) of 5 to 25, and wherein the multimodal HDPE comprises at least two fractions:

(A) 30 to 70 wt %, relative to the total weight of the multimodal HDPE, of a lower molecular weight fraction being a polyethylene with a density in the range of 955 to 980 kg/m$^3$ measured according to ISO 1183 and an $MFR_2$ of 100 to 1000 g/10 min measured according to ISO 1133; and (B) 30 to 70 wt %, relative to the total weight of the multimodal HDPE, of a higher molecular weight fraction being a polyethylene with a density in the range of 940 to 960 kg/m$^3$ measured according to ISO 1183 and an $MFR_2$ of 0.0001 to 1.0 g/10 min measured according to ISO 1133; and (ii) 1 to 10 wt %, relative to the total weight of the polymer composition, of a hydrocarbon resin, wherein the hydrocarbon resin has a weight average molecular weight of less than 20,000 Daltons.

2. The biaxially oriented monolayer film as claimed in claim 1, wherein fraction (A) is present in an amount of 35 to 50 wt %, relative to the total weight of the multimodal HDPE.

3. The biaxially oriented monolayer film as claimed in claim 1, wherein fraction (B) is present in an amount of 50 to 65 wt %, relative to the total weight of the multimodal HDPE.

4. The biaxially oriented monolayer film as claimed in claim 1, wherein the multimodal HDPE is bimodal and consists of fractions (A) and (B).

5. The biaxially oriented monolayer film as claimed in claim 1, wherein the lower molecular weight fraction (A) is an ethylene homopolymer.

6. The biaxially oriented monolayer film as claimed in claim 1, wherein the higher molecular weight fraction (B) is an ethylene copolymer with at least one alpha-olefin comonomer.

7. The biaxially oriented monolayer film as claimed in claim 1, wherein said hydrocarbon resin is a cyclic aliphatic hydrocarbon resin.

8. The biaxially oriented monolayer film as claimed in claim 1, wherein said multimodal HDPE is present in an amount of 92 to 98.5 wt %, relative to the total weight of the polymer composition.

9. The biaxially oriented monolayer film as claimed in claim 1, wherein said hydrocarbon resin is present in an amount of 1.5 to 8 wt %, relative to the total weight of the polymer composition.

10. The biaxially oriented monolayer film as claimed in claim 1, wherein said film has a tensile modulus (TM) in the machine direction (MD) of 1000 to 4000 MPa, determined according to ISO 527-3 on 15 μm films.

11. The biaxially oriented monolayer film as claimed in claim 1, wherein said film has a haze of 0.5 to 9.0%, determined according to ASTM D1003 on film samples with a thickness of 15 μm.

12. A laminated film structure comprising the biaxially oriented monolayer film as defined in claim 1 laminated to a substrate.

13. The laminated film structure as claimed in claim 12 wherein the structure consists of polyethylene polymers only.

14. A method of use of a polymer composition having a density in the range of 954 to 970 kg/m$^3$ measured according to ISO 1183 and an $MFR_2$ of 0.5 to 2.0 g/10 min measured according to ISO 1133, wherein said composition comprises:

(i) 90 to 99 wt %, relative to the total weight of the polymer composition, of a multimodal high density polyethylene (HDPE), wherein the multimodal HDPE has a density in the range of 945 to 970 kg/m$^3$ measured according to ISO 1183, an $MFR_2$ of 0.1 to 3.0 g/10 min according to ISO 1133 and a molecular weight distribution (MWD) of 5 to 25, and wherein the multimodal HDPE comprises at least two fractions:

(A) 30 to 70 wt %, relative to the total weight of the multimodal HDPE, of a lower molecular weight fraction being a polyethylene with a density in the range of 955 to 980 kg/m$^3$ measured according to ISO 1183 and an $MFR_2$ of 100 to 1000 g/10 min measured according to ISO 1133; and (B) 30 to 70 wt %, relative to the total weight of the multimodal HDPE, of a higher molecular weight fraction being a polyethylene with a density in the range of 940 to 960 kg/m$^3$, measured according to ISO 1183 and an $MFR_2$ of 0.0001 to 1.0 g/10 min measured according to ISO 1133; and (ii) 1 to 10 wt %, relative to the total weight of the polymer composition, of a hydrocarbon resin, wherein the hydrocarbon resin has a weight average molecular weight of less than 20,000 Daltons;

in the production of the biaxially oriented monolayer film as claimed in claim 1.

15. The biaxially oriented monolayer film as claimed in claim 1, wherein fraction (A) is present in an amount of 40 to 50 wt %, relative to the total weight of the multimodal HDPE.

16. The biaxially oriented monolayer film as claimed in claim 1, wherein fraction (B) is present in an amount of 50 to 60 wt %, relative to the total weight of the multimodal HDPE.

17. The biaxially oriented monolayer film as claimed in claim 6, wherein the at least one alpha-olefin comonomer comprises butene.

18. The biaxially oriented monolayer film as claimed in claim 1, wherein said multimodal HDPE is present in an amount of 93 to 98 wt %, relative to the total weight of the polymer composition.

19. The biaxially oriented monolayer film as claimed in claim 1, wherein said hydrocarbon resin is present in an amount of 2 to 7 wt %, relative to the total weight of the polymer composition.

* * * * *